(12) United States Patent
Manera et al.

(10) Patent No.: US 9,223,859 B2
(45) Date of Patent: Dec. 29, 2015

(54) METHOD AND APPARATUS FOR SUMMARIZING COMMUNICATIONS

(75) Inventors: Alvaro Manera, Espoo (FI); Moises Martinez, Berlin (DE)

(73) Assignee: HERE GLOBAL B.V., Veldhoven (NL)

( * ) Notice: Subject to any disclaimer, the term of this patent is extended or adjusted under 35 U.S.C. 154(b) by 214 days.

(21) Appl. No.: 13/105,535

(22) Filed: May 11, 2011

(65) Prior Publication Data

US 2012/0290289 A1    Nov. 15, 2012

(51) Int. Cl.
G06F 17/27    (2006.01)
G06F 17/30    (2006.01)

(52) U.S. Cl.
CPC ...... *G06F 17/30719* (2013.01); *G06F 17/2785* (2013.01)

(58) Field of Classification Search
None
See application file for complete search history.

(56) References Cited

U.S. PATENT DOCUMENTS

| | | | | |
|---|---|---|---|---|
| 4,594,686 | A * | 6/1986 | Yoshida | 704/8 |
| 5,369,573 | A * | 11/1994 | Holloran et al. | 715/234 |
| 6,023,669 | A * | 2/2000 | Suda et al. | 704/2 |
| 6,205,456 | B1 * | 3/2001 | Nakao | 715/201 |
| 6,308,187 | B1 * | 10/2001 | DeStefano | 715/234 |
| 6,816,884 | B1 | 11/2004 | Summers | |
| 6,895,257 | B2 | 5/2005 | Boman et al. | |
| 7,120,865 | B1 | 10/2006 | Horvitz et al. | |
| 7,346,494 | B2 * | 3/2008 | Ando et al. | 704/9 |
| 7,496,500 | B2 * | 2/2009 | Reed et al. | 704/9 |
| 7,587,309 | B1 * | 9/2009 | Rohrs et al. | 704/10 |
| 7,788,262 | B1 * | 8/2010 | Shirwadkar | 707/737 |
| 7,801,960 | B2 | 9/2010 | Hockey | |
| 8,108,398 | B2 * | 1/2012 | Guday et al. | 707/739 |
| RE43,861 | E * | 12/2012 | McEntee et al. | 704/4 |
| 8,392,183 | B2 * | 3/2013 | Weber | 704/231 |
| 2003/0158903 | A1 * | 8/2003 | Rohall et al. | 709/206 |
| 2003/0177190 | A1 * | 9/2003 | Moody et al. | 709/206 |
| 2004/0034520 | A1 * | 2/2004 | Langkilde-Geary et al. | 704/1 |
| 2004/0225651 | A1 | 11/2004 | Musgrove et al. | |
| 2004/0260533 | A1 * | 12/2004 | Wakita et al. | 704/4 |
| 2005/0108338 | A1 * | 5/2005 | Simske et al. | 709/206 |
| 2005/0192992 | A1 * | 9/2005 | Reed et al. | 707/101 |
| 2008/0187125 | A1 | 8/2008 | Siegrist | |
| 2010/0010815 | A1 | 1/2010 | Bells et al. | |

(Continued)

FOREIGN PATENT DOCUMENTS

CA    2 414 330 A1    6/2003
CA    2 670 560 A1    1/2010

(Continued)

OTHER PUBLICATIONS

Corston-Oliver et al., "Task-focused Summarization of Email", In Proceedings of the ACL-04 (pp. 43-50), 2004.*

(Continued)

*Primary Examiner* — Brian Albertalli
(74) *Attorney, Agent, or Firm* — Ditthavong & Steiner, P.C.

(57) ABSTRACT

A method, apparatus and computer program are provided for summarizing one or more communications. The method, apparatus and computer program process and/or facilitate a processing of one or more communications to generate at least one summary. The method, apparatus and computer program further cause, at least in part, a transformation of the at least one summary based, at least in part, on at least one narrative viewpoint. The method, apparatus and computer program further cause, at least in part, a presentation of the transformation.

21 Claims, 10 Drawing Sheets

(56) References Cited

U.S. PATENT DOCUMENTS

2010/0010816 A1 1/2010 Bells et al.
2012/0259852 A1* 10/2012 Aasen et al. .................. 707/737

FOREIGN PATENT DOCUMENTS

| | | |
|---|---|---|
| CA | 2 670 562 A1 | 1/2010 |
| EP | 2 315 129 A1 | 4/2011 |
| WO | WO 98/09228 A1 | 3/1998 |
| WO | WO 2007/087120 A2 | 8/2007 |
| WO | WO 2008/070094 A2 | 6/2008 |

OTHER PUBLICATIONS

Corston-Oliver, Simon, et al. "Task-focused summarization of email." ACL-04 Workshop: Text Summarization Branches Out. 2004.*

Faulring, Andrew, et al. "Agent-assisted task management that reduces email overload." Proceedings of the 15th international conference on Intelligent user interfaces. ACM, 2010.*

International Search Report for PCT/FI2012/050341 dated Jul. 24, 2012, pp. 1-5.

Written Opinion for PCT/FI2012/050341 dated Jul. 24, 2012, pp. 1-7.

"Autosummarize a document in Microsoft Office Word 2007," Microsoft in Education, accessed Aug. 11, 2011 (http://www.microsoft.com/education/autosummarize.aspx).

"TitleCase—Convert text to Title Case, UPPERCASE and lowercase," accessed Aug. 11, 2011 (http://titlecase.com/).

Antidze et al., "Software Tools for Morphological and Syntactic Analysis of Natural Language Texts," Tbilisi State University, Vekua Institute of Applied Mathematics.

Garvin, "The Fulcrum Syntactic Analyzer for Russian," The Bunker-Ramo Corporation, 1967.

Pancik, "Syntactic parser of English sentences," Jan. 14, 2008 (http://spes.sourceforge.net/).

Temperley, "Link Grammar," Aug. 20, 2009 (http://www.link.cs.cmu.edu/link/).

Extended European Search Report for related European Application No. 12782636.0, dated Oct. 10, 2014, 7 pages.

* cited by examiner

METHOD AND APPARATUS FOR SUMMARIZING COMMUNICATIONS

BACKGROUND

Service providers and device manufacturers (e.g., wireless, cellular, etc.) are continually challenged to deliver value and convenience to consumers by, for example, providing compelling network services. With such diverse and sophisticated network services and devices, more and more consumers carry at least one communication device with them at all times. For example, many consumers carry a cell phone with voicemail, SMS and e-mail capabilities so that they are reachable by many forms of communication at all times. The convenience, however, of being reachable at all times by many forms of communication comes with some challenges. With a continual stream of incoming communications, consumers can suffer from information overload, needing to review countless communications at a time to stay current with their busy schedules. Consumers can also find themselves in situations that require most of their attention focused on a primary task, yet the consumers would still value the ability to receive communications in a less distracting form. As such, service providers and device manufacturers face significant technical challenges to providing services that ease information overload and maintain some level of connectivity despite situations that require limited distractions.

SOME EXAMPLE EMBODIMENTS

Therefore, there is a need for an approach for summarizing communications to filter each communication into a summary that includes the relevant information and presenting the summary to a user in a way that allows the user to apprehend the information quickly and with limited distraction, especially in situations where receiving the communication is not the primary task of the user.

According to one embodiment, a method comprises processing and/or facilitating a processing of one or more communications to generate at least one summary. The method also comprises causing, at least in part, a transformation of the at least one summary based, at least in part, on at least one narrative viewpoint. The method further comprises causing, at least in part, a presentation of the transformation.

According to another embodiment, an apparatus comprises at least one processor, and at least one memory including computer program code for one or more programs, the at least one memory and the computer program code configured to, with the at least one processor, cause, at least in part, the apparatus to process and/or facilitate a processing of one or more communications to generate at least one summary. The apparatus is also caused to transform the at least one summary based, at least in part, on at least one narrative viewpoint. The apparatus is further caused to present the transformation.

According to another embodiment, a computer-readable storage medium carries one or more sequences of one or more instructions which, when executed by one or more processors, cause, at least in part, an apparatus to process and/or facilitate a processing of one or more communications to generate at least one summary. The apparatus is also caused to transform the at least one summary based, at least in part, on at least one narrative viewpoint. The apparatus is further caused to present the transformation.

According to another embodiment, an apparatus comprises means for processing and/or facilitating a processing of one or more communications to generate at least one summary. The apparatus also comprises means for causing, at least in part, a transformation of the at least one summary based, at least in part, on at least one narrative viewpoint. The apparatus further comprises means for causing, at least in part, a presentation of the transformation.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for summarizing communications are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although various embodiments are discussed with respect to communications, it is contemplated that any type of language-based information not traditionally considered a communication (e.g., instructions, books, magazines, newspapers, attachments to communications, etc.) can be summarized in accordance with the embodiments discussed below.

Figure 1:
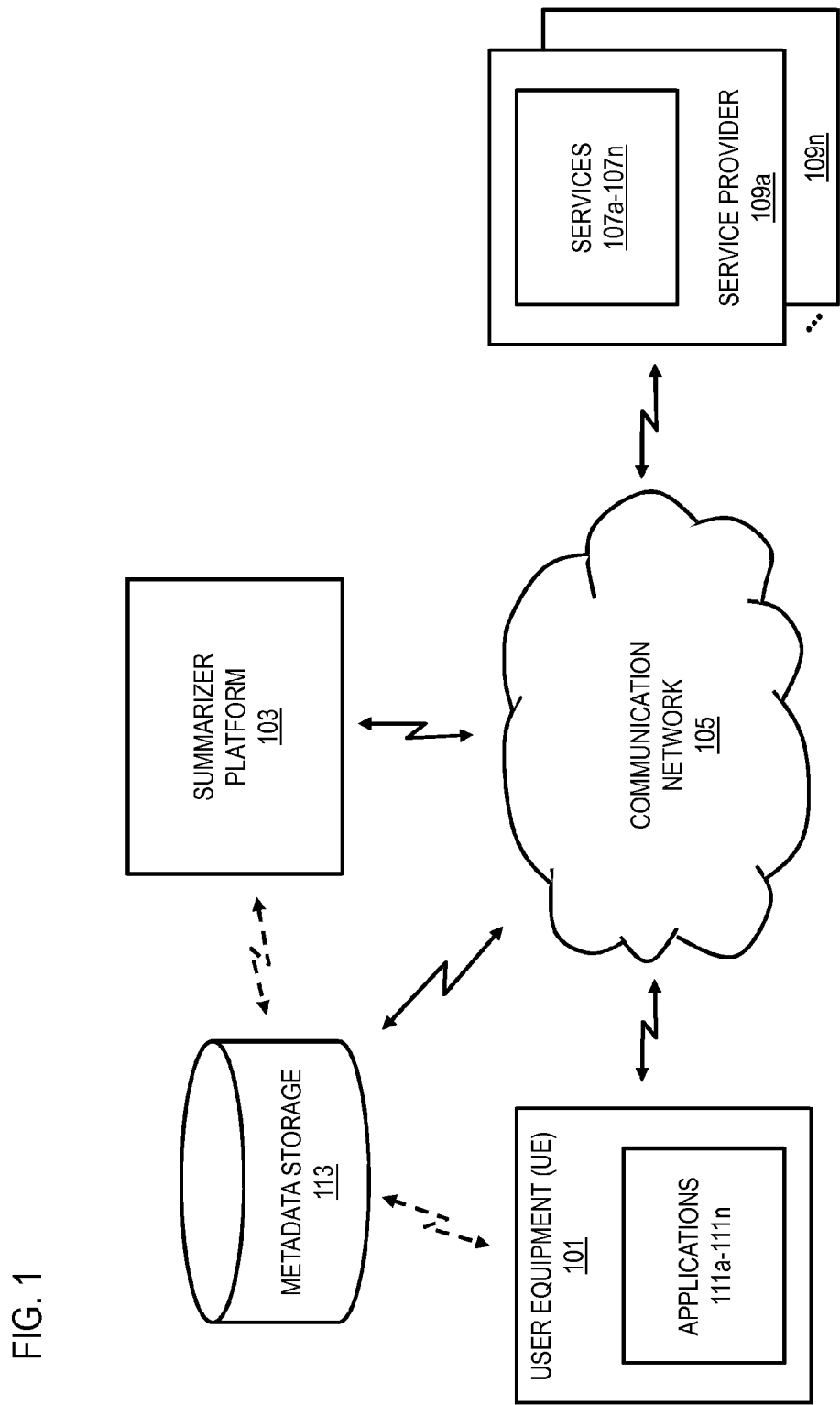
FIG. 1 is a diagram of a system capable of summarizing one or more communications, according to one embodiment.

FIG. 1 is a diagram of a system capable of summarizing communications, according to one embodiment. As discussed above, many consumers find themselves carrying at least one communication device with them at all time. Consumers do this, in part, because of the large flow of information that is accessible through their communication device. Consumers also do this, in part, because they are required to stay in communication with, for example, their job, family members, friends, clients, etc. Because of the large flow of information that occurs on a daily basis, sometimes consumers feel overloaded by the large amount of communications they need to review and the information contained within the communications. Consumers would appreciate reviewing summaries of the communications that still include the relevant and essential information from the original communication. Consumers would also appreciate having the summary presented to them in a way that is easily understandable.

Efforts to ease the information overload have included using text-to-speech synthesizers to read text communications to the consumers. However, especially, for long communications, such as detailed e-mail communications, converting the text into speech and reading the entire communication to the consumer does not effectively reduce the information overload. The user is still left overloaded by having to listen to and process the entire communication, rather than reading the entire communication. The ability to receive a communication in the form of speech, rather than having to read the communication, may allow the user to perform a primary task, such as driving a car, but the read to understand and process the entire e-mail can still heavily distract from the primary task. Rather than concentrating on the primary task, the user is left having to concentrate on listening to the communication read aloud and process the entire communication.

Efforts to ease the information overload also have included generating a summary of the communication and presenting the summary to the consumer rather than the entire original communication. However, attempts to generate a summary have failed to include the relevant information within the original communication. Additionally, attempts to generate the summary have failed to generate a summary that is easily understandable by the consumer. Previous attempts merely extracted terms out of the original communication and presented the terms in an unnatural language form. Although the consumer is has to process less information, processing the information is no less easy than processing the entire original communication because the user has to understand a summary that is not easily understandable, if at all.

To address these problems, a system 100 of FIG. 1 introduces the capability to generate a summary of one or more communications that contain the relevant information of the original one or more communications and present the summary in a manner that is easily understandable to a user. By way of example, a user receives an e-mail at the user's cell phone while driving a car. The system 100 automatically starts processing the e-mail to generate a summary in response to the system 100 detecting that the user's current primary task is driving the car. The system 100 parses the e-mail into the smallest data elements (e.g., the subjects, verbs and objects within the e-mail). After parsing the e-mail into the data elements, the system consolidates relevancy information regarding the data elements using a grammar analyzer for the target language. The system 100 also compares the data elements to metadata to generate the relevancy information. The metadata can include information from the user's cell phone, such as a contacts list, a e-mail application, a calendar application, etc. that contains information that the system can associate to the data elements extracted from the one or more communications. The system 100 further compares the data elements to the metadata to generate transformation information. The transformation information allows the system 100 generate the summary according a set narrative viewpoint so that the summary us presented in a more easily understandable form to the user. After the above analysis, the system 100 generates the summary of the relevant data elements in the set narrative viewpoint and presents the summary to the user using a text-to-speech synthesizer that causes little to no distraction of the primary task of driving. Thus, the system 100 allows the user to receive the relevant information regarding the one or more communications in any easy to understand format while maintaining his or her attention to the primary task of driving the car.

As shown in FIG. 1, the system 100 comprises user equipment (UE) 101 having connectivity to a summarizer platform 103, a metadata storage 113 and service providers 109*a*-109*n* (collectively referred to as service providers 109) via a communication network 105. The UE 101 may run one or more applications 111*a*-111*n* (collectively referred to applications 111). The applications 111 can include, for example, e-mail applications, mapping applications, navigation applications, messaging applications, calendar applications, sensor applications, Internet browser applications, social networking applications, audio applications, text-to-speech and speech-to-text applications, etc. The service providers 109 can provide one or more services 107*a*-107*n* (collectively known as services 107) (e.g., communication services, location based services, mapping services, navigation services, social networking services, banking services, etc.) to the UE 101. The metadata storage 113 stores the metadata. In one embodiment, the metadata storage 113 is an independent element of the system 100, as illustrated in FIG. 1. In one embodiment, the metadata storage 113 can be part of the UE 101. In one embodiment, the metadata storage 113 can be part of the summarizer platform. In one embodiment, the metadata storage 113 can be provided as one or more service 107 by one or more of the service providers 109. The summarizer platform 103 generates the summaries of one or more communications, as discussed below. In one embodiment, the summarizer platform 103 is an independent element of the system 100. In one embodiment, the summarizer platform 103 is part of the UE 101 as, for example, one of the applications 111 or a hardware module. In one embodiment, the summarizer platform 103 is provided by one or more service 107 by one or more service provider 109.

By way of example, the communication network 105 of the system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, the metadata storage 113, the summarizer platform 103 and the service providers 109 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
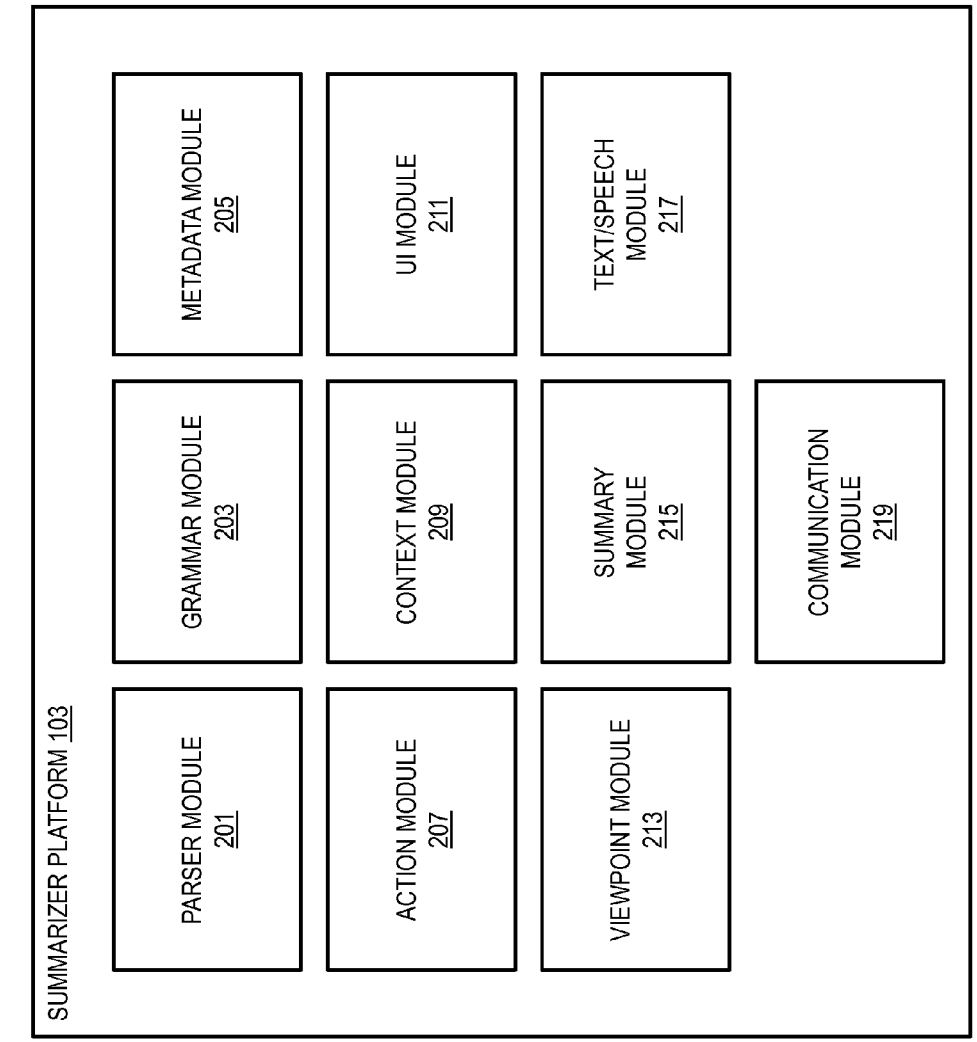
FIG. 2 is a diagram of the components of a summarizer platform, according to one embodiment.

FIG. 2 is a diagram of the components of the summarizer platform 103, according to one embodiment. By way of example, the summarizer platform 103 includes one or more components for providing summaries of communications. It is contemplated that the functions of these components may be combined in one or more components or performed by other components of equivalent functionality. In this embodiment, the summarizer platform includes a parser module 201, a grammar module 203, a metadata module 205, an action module 207, a context module 209, a user interface (UI) module 211, a viewpoint module 213, a summary module 215, a text/speech module 217 and a communication module 219.

The parser module 201 parses one or more communications into the basic elements of the communications. By way of example, the parser module 201 parses an e-mail message into the various data elements that convey the information, such as the subjects, verbs and objects within the e-mail. In one embodiment, the parser module 201 can first parse the e-mail message into the various sentences that convey the information. The parser module 201 can then parse the various sentences into the various data elements that convey the information, such as the subjects, verbs and objects within each e-mail. The parser module 201 decomposes the one or more communications into the data elements for analysis of the elements by the other components of the summarizer platform 103. In one embodiment, the parser module 201 can also translate the one or more communications into one or more different languages for processing and/or generating the one or more summaries. The parser module 201 translates the one or more communications using conventional translation methods.

The grammar module 203 contains one or more grammar analyzers that determine relevancy information of the various parsed data elements from the parser module 201 for ranking the data elements to later determine which data elements should be included and excluded from the generated summary. The grammar module 203 also determines the semantics of the data elements in the communication to determine how the data elements used in the generated summary should be modified to correspond to the desired narrative viewpoint. By way of example, the grammar module 203 determines the narrative viewpoint of the data elements in the communication and determines how the narrative viewpoints should be modified by the viewpoint module 213 discussed below.

In one embodiment, the grammar module 203 applies extraction and abstraction natural language processing (NLP) technologies of word segmentation, stop word removal and summarization to each communication to determine the relevancy information of the various parsed data elements. In various embodiments, semantics of the various parsed data elements are determined based on a vocabulary model in the grammar module 203. For example, in various embodiments, probabilistic latent semantic indexing (pLSI) or Latent Dirichlet allocation (LDA) is used to deduce semantics from words in the communication and determine relevancy. Such methods can be used to derive short text string words and topics from a set of documents that are directed to the everyday circumstances of consumers of network services. Because each topic is associated with a group of words in certain relative abundances, there is a topology relating topics to words and subtopics to higher level topics that breaks down the communication to determine the relevancy of the data elements.

By way of example, one grammar analyzer determines the respective frequencies of the one or more data elements within each sentence, within each communication and/or within all of the communications. For example, the grammar analyzer determines the frequencies of the subjects, verbs and objects parsed from the communication by the parser module 201. By way of example, one grammar analyzer determines the relationship information among the one or more data elements, such as how the data elements refer to each other and/or modify each other. By way of example, one grammar analyzer compares the data elements to one or more definitions for each data element. In one embodiment, one grammar analyzer can perform a combination of the above three grammar analyzers. Based on the analysis of the grammar of the data elements, the grammar module 203 determines relevancy information for the data elements to determine, in part, which data elements are included in the summary presented to the user and which data elements are filtered out of the summary.

The metadata module 205 compares the data elements from the parser module 201 to metadata associated with the one or more data elements. The metadata module 205 generates relevancy information by comparing the data elements to the metadata to determine, in part, which data elements are presented to the user and which data elements are filtered out of the summary. The metadata module 205 also generates transformation information by comparing the data elements to the metadata. By way of example, the metadata module 205 compares e-mail addresses listed in the "TO:" and "FROM:" boxes to metadata contained, for example, in an address book or contacts list stored on a cell phone. Based on information stored in the address book or contacts list, the metadata module determines that the e-mail originates from the manager of the individual user that owns the cell phone. By way of example, based on the e-mail originating from the cell phone user's manager, any data element and/or sentence concerning the manager's name is deemed more relevant than data elements and/or sentences that do not concern the manager's name. By comparing the data elements to the metadata, the metadata data information can be included in the summary associated with the specific data elements to better relate the data elements to the user so that the user more easily processes the summary.

The action module 207 compares the data elements from the parser module 201 and, for example, relationship information from the grammar module 203 to determine whether any action is required by the user in response to the one or more communications. For example, in one communication, a question is posed to the user regarding their availability to attend a meeting. In response, the action module 207 generates a prompt for the user whether to RSVP to the meeting and whether to add the meeting to a calendar.

The context module 209 determines context information of the user, the UE 101 or a combination thereof to determine, for example, whether to generate summaries for one or more communications. The context module 209 can gather context information from, for example, one or more applications 111 running on the UE 101, one or more hardware modules on the UE 101, one or more services 107 provided by one or more service providers 109, etc.

In one embodiment, the context module 209 determines whether the summarizer platform 103 should generate one or more summaries for one or communications. By way of example, the context module 209 determines that the UE 101 is currently running a navigation application with an active navigation route. In response, the context module 209 triggers the summarizer platform 103 to activate and generate summaries for one or more communications to avoid distracting the user from the primary task of driving.

In one embodiment, the context module 209 controls an approximate degree that the one or more communications are summarized. For example, the context module 209 determines from a signal from the speedometer of the car that the car is traveling faster than a certain threshold (e.g., 85 mph). In response, the context module 209 triggers the summarizer platform 103 to activate and generate summaries that have approximately less than 25% of the information and/or language contained in the original one or more communications. If the context module 209 determines from a signal from the speedometer that the car is traveling slower than the threshold, the context module 209 can trigger the summarizer platform 103 to activate and generate summaries that have approximately 75% of the information and/or language contained in the original communication, based on the assumption that more information can be presented to the user because the speed is slower.

Although the context module 209 controls the approximate degree that the one or more communications are summarized, the approximate degree is an estimation that is, in part, dependent on the capacity to condense the relevant information to the specified percentage. Thus, communications that have mostly relevant or mostly irrelevant information will be above or below the set approximation degrees, respectively. For example, a short message can contain highly relevant information such that, based on the length of the message and the highly relevant information, the generated summary will exceed the set approximation degree (e.g., approximately 25%). Conversely, a long message can contain mostly irrelevant information, such as information that does not pertain to the user of the UE 101, and the generated summary will be below the set approximation degree (e.g., approximately 75%). In one embodiment, the content module 209 takes into account the relevancy of the information contained in the one or more communications, the length of the one or more communications and the set approximation degree, and generates the one or more summaries as close as possible to the set approximation degree.

In one embodiment, the context module 209 determines which communications should be passed to the UE 101 without generating summaries and which communications should be summarized, and a combination thereof. By way of example, if the context information of the UE 101 indicates that the user should receive little to no distraction, the context module 209 can determine to generate summaries for all of the incoming communications. If the context information of the UE 101 indicates that the user can receive some medium distractions, the context module 209 can determine that the summarizer platform 103 should generate summaries for incoming communications above a certain number of words and/or above a certain amount of time.

The UI module 211 generates the user interface used in interacting with the summarizer platform 103.

The viewpoint module 213 allows for setting the summarizer platform 103 to a certain narrative viewpoint for generating the summaries of the one or more communications. The viewpoint module 213 determines the narrative viewpoint of the various data elements based on the determination of the current narrative viewpoint of the data elements by the grammar module 203. In one embodiment, the summarizer platform 103 can be set between three different narrative viewpoints: first person, second person and third person. By way of example, a first-person summary refers to the user as "I," such as "I am scheduled to attend the April 16 meeting." The first-person summary is generated in the natural language as if the summary is the user's own thoughts, for example as if the user is reading the summary to himself or herself. The second-person summary refers to the user as "You," such as "You are scheduled to attend the April 16 meeting." The third-person summary refers to the user by name, such as "Bob Doe is scheduled to attend the April 16 meeting." The second-person and third-person summaries are generated in a natural language form as if a personal assistant is presenting the summary to the user, where the personal assistant is referring directly to the user in the second-person summary and addressing the user by name in the third-person summary. By presenting the summary in the second-person narrative viewpoint, as if a personal assistant is presenting the summary to the user directly, the user can easily comprehend and understand the summary without unnecessary additional thought. To generate the set narrative viewpoint, the viewpoint module 213 interacts with the metadata module 205 and the grammar module 203 to convert the data elements, and generate data elements, according to the set narrative viewpoint.

The summary module 215 interacts with the grammar module 203, the metadata module 205, the action module 207, the context module 209 and the viewpoint module 213 to generate the summaries for the one or more communications. By way of example, the context module 209 determines, based on the context information of the UE 101, that the generated summary should include approximately half of the language used in the original communication. Based on the relevancy rankings of the data elements by the grammar module 203, in combination with the relevancy rankings of the metadata module 205, the summary module 215 selects approximately the top 50% most relevant data elements from the original communication to contain in the summary. The summary module 215 interacts with the grammar module 203 and the viewpoint module 213 to ensure that the data elements used in the generated summary and added to the summary are either already in the correct narrative viewpoint or are converted into the correct narrative viewpoint. The summary module 215 also inserts any prompt generated by the action module 207 in the generated summary to complete the formation of the summary.

The text/speech module 217 has, in one embodiment, two roles. In one role, the text/speech module 217 converts the text of the generated summary into speech so that the summary can be presented to the user in the form of an audio message. In the other role, the text/speech module 217 converts the audio of one or more incoming communication into text for processing by the other modules of the summarizer platform 103. For example, a voicemail is left on the user's cell phone because the user is busy driving and could not answer a phone call. In generating the summary with the summarizer platform 103, the text/speech module 217 converts the voicemail into a text string for further processing by the summarizer platform 103. In one embodiment, the text/speech module 217 only acts as a text-to-speech synthesizer for converting the one or more summaries into audio messages and does not convert one or more audio communications into text.

The communication module 219 presents the one or more generated summaries to the user. In one embodiment, the communication module 219 presents the one or more summaries as one or more audio messages using the text/speech module 217 to synthesize the audio messages. In one embodiment, the communication module 219 presents the one or more summaries as one or more messages displayed on the screen of the UE 101 and not in the form of audio messages. In one embodiment, the communication module 219 presents the one or more summaries as both one or more messages displayed on the screen of the UE 101 and one or more audio messages using the text/speech module 217 to synthesizer.

Figure 3:
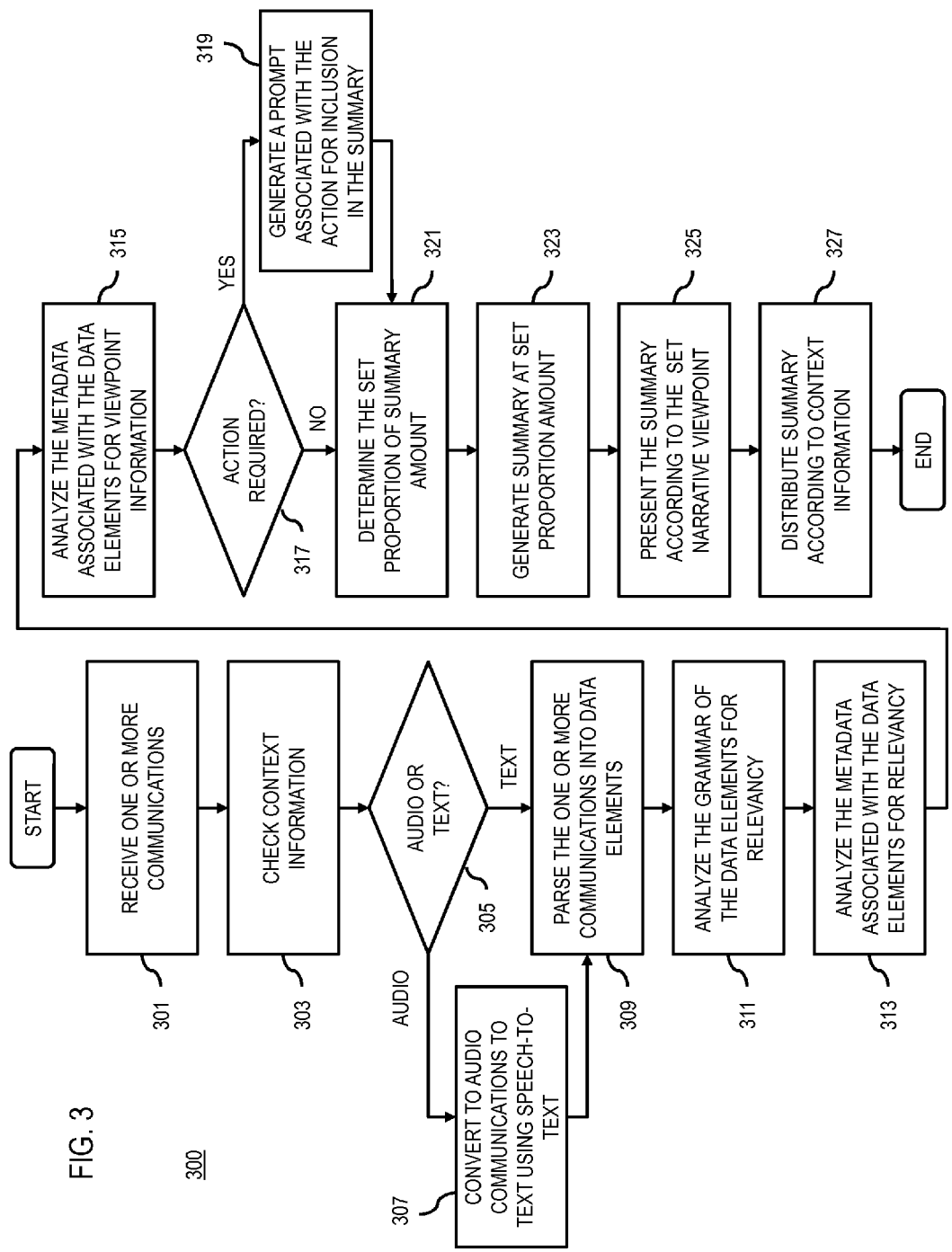
FIG. 3 is a flowchart of a process for summarizing one or more communications, according to one embodiment.
Figure 8:
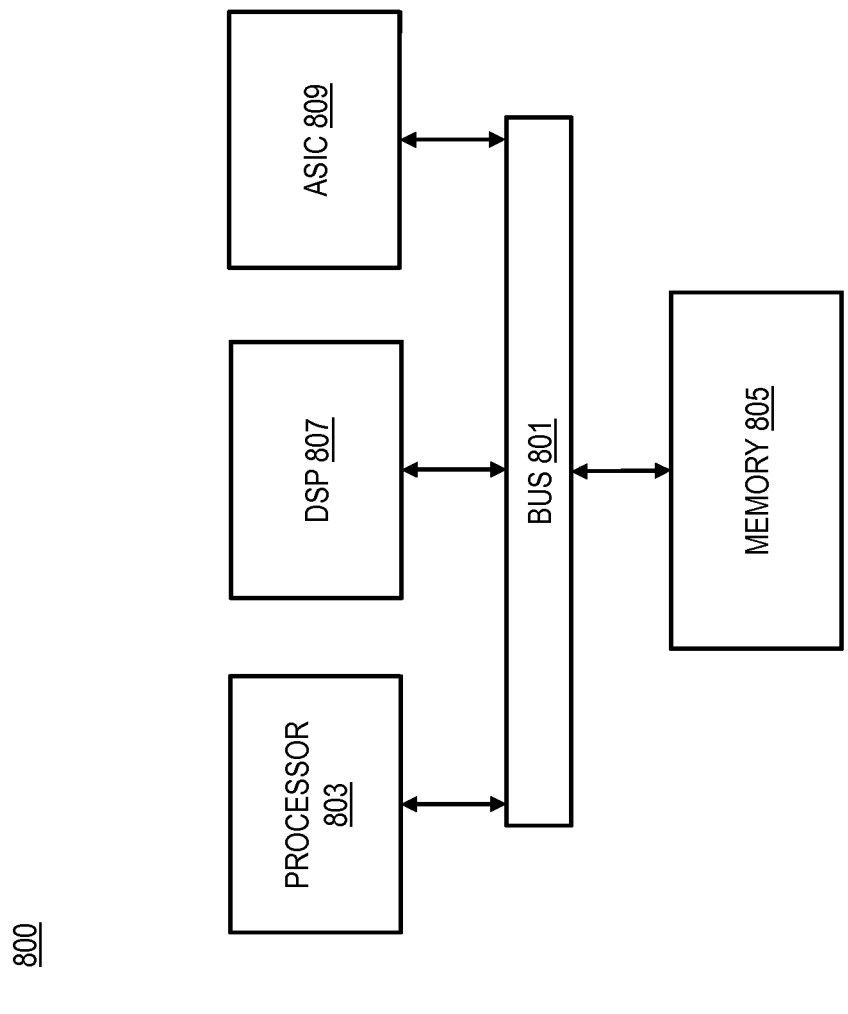
FIG. 8 is a diagram of a chip set that can be used to implement an embodiment of the invention.

FIG. 3 is a flowchart of a process for summarizing communications, according to one embodiment. In one embodiment, the summarizer platform 103 performs the process 300 and is implemented in, for instance, a chip set including a processor and a memory as shown in FIG. 8. In step 301, the summarizer platform 103 receives one or more communications. In one embodiment, the communications can be in the form of audio communications and textual communications. For example, the one or more communications can be voicemails, SMS messages, MMS messages with text, e-mails, etc. In one embodiment, the communications can also include non-traditional communications that none-the-less have language in the form of audio or text, such as instructions from an instruction manual, newspapers, magazines, books, radio broadcasts, books on tape, etc. In one embodiment, the summarizer platform 103 also generates one or more summaries of one or more attachments to the communications. For example, one communication can be a brief e-mail that refers the user to a long document attached to the e-mail. The summarizer platform 103 can also summarizes the long document that is attached to the e-mail and which was the primary information contained in the e-mail. In one embodiment, the summarizer platform 103 stores one or more communications prior to processing the communications to create summaries for one or more of the communications at a later time. In one embodiment, the summarizer platform 103 processes each communication substantially immediately after receiving the communication.

In step 303, the summarizer platform 103 checks the context module 209 for context information associated with the UE 101, the user of the UE 101, or a combination thereof to determine whether the context of the UE 101, the user of the UE 101, or the combination thereof requires summaries of the one or more communications. By way of example, as discussed above with respect to the context module 209, if the UE 101 is currently running a navigation application 111 that has an active route guidance, the context module 209 of the summarizer platform 103 determines to generate one or more summaries of one or more communications that are received at the UE 101 to distract the user a little as possible. In one embodiment, the determination in step 303 can be one of on or off. For example, either the context information of the UE 101, the user of the UE 101, or a combination thereof is such that either communications should be summarized or not. In one embodiment, the determination at step 303 can be both a determination of whether summaries should be generated as well as an approximation of the amount of the original information and/or language from the one or more communications that are contained in the summary. For example, if the context information indicates that little to no distraction is required, the summarizer platform 103 can generate short messages that contain approximately less than 25% of the information and/or language of the original one or more communications. If the context information indicates that medium distractions can be passed to the user, the summarizer platform 103 can generate medium to long messages that contain approximately 50% to 75% of the information and/or language of the original one or more communications. In one embodiment, the if the context information indicates that little to no distraction is required, the summarizer platform 103 can generate summaries for all of the incoming communications. If the context information indicates that medium distractions can be passed to the user, the summarizer platform 103 can pass low distraction communications to the user without generating summaries and generate summaries for high distraction communications.

In step 305, the summarizer platform 103 determines whether the one more communications are audio or textual communications. In one embodiment, if one or more of the communications are audio, the process 300 proceeds to step 307. If one or more of the communications are textual, or all of the communications are textual, the process also proceeds to step 309, or proceeds to step 309 without also proceeding to step 307, respectively. In one embodiment, where the summarizer platform 103 accepts only textual communications, step 305 is removed.

In step 307, the summarizer platform 103 converts the audio communications into textual communications for further processing by the process 300. The summarizer platform 103 converts the audio communications to text using conventional speech-to-text synthesizers. In one embodiment, where the summarizer platform 103 accepts only textual communications, step 307 is removed.

In step 309, the summarizer platform 103 parses the one or more communications into various data elements using the parser module 201. The various data elements can be, for example, sentences of the one or more communications and/or subjects, verbs and objects within the sentences. By parsing the one or more communications, the summarizer platform 103 is able to decompose the text of the one or more communications into basic grammar pieces that are later analyzed in the process 300 to generate the one or more summaries. In one embodiment, the parser module 201 in the summarizer platform 103 also has the ability to translate the one or more communications into one or more different languages using conventional translation processes. For example, a communication can be received in Spanish and parsed into English for analysis and generation of the one or more summaries.

In step 311, the summarizer platform 103 analyzes the various data elements generated from step 309 using the grammar module 203 discussed above. By way of example, the grammar module 203 ranks the data elements and determines the semantics of the data elements in the communication to determine how the data elements used in the generated summary should be modified to correspond to the desired narrative viewpoint and the various relevancy rankings of the data elements. Using one or more grammar analyzers, the summarizer platform 103 determines the relevancy of the data elements by, for example, determining the frequency at which the data elements appear, with a higher relevancy given to data elements that have a higher frequency. By way of example, a name repeated throughout one communication is given a high relevancy rating because it is probably important to include the name in the summary, at least based on the frequency. The summarizer platform 103 can also determine relevancy of the data elements by, for example, determining the relationships between the data elements, with a higher relevancy given to data elements that share relationships with other data elements that have a high relevancy. By way of example, a subject or object that shares a relationship with a subject or object that appears repeatedly in the one or more communications is given a high relevancy because it is probably related to the relevancy of the subject or object that also has a high relevancy rating. The summarizer platform 103 can also determine relevancy of the data elements by, for example, determining the definitions of the data elements, with certain definitions given higher relevancy than other definitions. By determining the relevancy information of the various data elements, the summarizer platform 103 is able to filter the one or more communications to filter out what data elements are not important enough to include in the summary and what data elements are important enough to include in the summary, at least based in part on the grammar analysis.

In step 313, the summarizer platform 103 compares the various data elements with metadata stored in, for example, the metadata storage 113. As discussed above, the metadata can include various information, such as information from a contacts list, an address book, a calendar application, a client list, a company directory, an Internet phonebook, etc. The summarizer platform 103 compares the various data elements with the metadata to determine relevancy information that is used alone or in combination with the relevancy information generated from the grammar module 203. By way of example, e-mail addresses listed in an e-mail are compared to metadata to gather information regarding the individuals associated with the emails. Thus, if an e-mail is sent to Bob Doe from Jim John, in step 313 the summarizer platform 103 compares the e-mail address of Jim John with the address book or contacts list for Bob Doe and determines that Jim John is Bob Doe's manager. That the e-mail is sent from a manager makes the data element of "Jim John" associated with the e-mail address relevant and more likely to be included in the summary. If, for example, the e-mail is from a party that is not recognized in the metadata, chances are the data element associated with the party is not relevant and the communication could be, for example, SPAM. Generating relevancy information by comparing the various data elements with metadata allows the summarizer platform 103 to filter the various data elements to determine which data elements are included in the summary. Comparing the data elements to the metadata can also determine relevant terms that should be included in the summary that the grammar analysis alone would not necessarily determine relevant based on, for example, the frequency information, the relationship information and/or the definition information.

In addition to determining additional relevancy information in step 313, the summarizer platform 103 includes information generated from the metadata in the one or more generated summaries to provide greater information to the user. For example, instead of merely referring to the sender's name in the case of an e-mail, the summarizer platform 103 can include the sender's relationship to the user, such as "Jim John, your manager" in the summary. The inclusion of "your manager" is based, in part, on the summarizer platform 103 determining from the metadata that Jim John is Bob Doe's manager and determining that including the term "manager" in the summary is relevant. This allows the user to place the information contained in the one or more communication in a better context. Further, the summarizer platform 103 can be set to summarize all of the one or more communications in terms of the subject of the communications. By way of example, the one or more communications are summarized regardless of the subject of the one or more communications. In one embodiment, the summarizer platform 103 can be set to summarize only parts of the one or more communications that pertain to the user either individually or in a group. For example, if, when comparing the metadata to the various data elements, the summarizer platform 103 determines that a reference to a group of individuals discussed in the one or more communications includes the user, the summarizer platform 103 may include reference to the portion of the one or more communications that concerns the group because it most likely concerns the individual and disregard the other portions of the one or more communications that do not concern the group or the user individually. In one embodiment, the summarizer platform 103 can be set to summarize only parts of the one or more communications that pertain to the user specifically. By way of example, the summarizer platform 103 will summarize only the portions of the one or more communications that pertain specifically to the user. This allows the user to control the specificity of the summarizes and further reduce the information overload felt by the user by disregarding and not having to comprehend information within the one or more communications that does not concern the user.

In step 315, the summarizer platform 103 compares the various data elements with metadata stored in, for example, the metadata storage 113. In this step, the summarizer platform 103 compares the various data elements with the metadata to determine viewpoint transformation information to provide a summary with a more natural language flow. By way of example, if an e-mail address is sent to Jim John, references to the name Jim John within the e-mail are associated with the various narrative viewpoints of language, such as first person, second person and third person. Thus, in the summary, rather than including the form of the name Jim John that is actually used in the communication, the name Jim John can be replaced with, for example, "I," "you" or another form of the name as determined by the summarizer platform 103 and/or set by the user. By being able to customize the narrative viewpoint of information presented in the summary, the summarizer platform 103 can create a summary with a more natural language. In situations where references to the user's name in the summary are changed to, for example, "you," the summary is presented to the user as if a personal assistant generated the summary specifically for the user and allows the user to process better the information in the summary. As a further example, for the situation above where the summarizer platform 103 includes metadata in the summary, the narrative viewpoint of the above example "Jim John, your manager" can be changed to "Jim John, my manager" or "Jim John, Bob Doe's manager" depending on the set narrative viewpoint. By changing the narrative viewpoint of the summary, the summarizer platform 103 can provide whatever narrative viewpoint is preferred by the user. Although the above examples pertain to only several words, the summarizer platform 103 generates the entire one or more summaries in the set narrative viewpoint so that all of the one or more summaries are entirely in the same narrative viewpoint.

In step 317, the summarizer platform 103 determines whether one or more actions are required based on the information contained in the one or more communications. In one embodiment, the summarizer platform 103 determines that an action is required based on one or more sentences ending in a question mark and/or based on one or more sentences being phrased as a question. In response, the summarizer platform 103 determines that the information contained in the one or more sentences requires action from the user. In one embodiment, the summarizer platform 103 determines that the one or more communications require an action based on the analysis of the grammar. In one embodiment, the summarizer platform 103 determines that an action is required based on any one or more of the grammar analysis, the metadata analysis and whether one or more sentences end in a question mark or are phrased as a question. If the summarizer platform 103 determines that one or more actions are required, the process 300 proceeds to step 319. If the summarizer platform 103 determines that the one or more communications do not require an action, the process 300 proceeds to step 321.

In step 319, the summarizer platform 103 generates one or more prompts that are included in the summary. By way of example, if one or more of the communications included a question regarding whether the user will be able to attend a function on a certain date, the summarizer platform 103 generates a prompt regarding whether the user wants to RSVP to the function on the date. In the same situation, the summarizer platform 103 generates a prompt regarding whether the user wants to add the function on the date to the user's calendar. Inclusion of the prompt adds to the functionality of the summary and to the ease of the information overload felt by the user receiving a multitude of communications. Prompts generated by the summarizer platform 103 and included in the summary can relate to any type of information and can interact with any one or more applications 111 running on the UE 101 or with any one or more service providers 109 running one or more services 107. The prompts generated by the summarizer platform 103 are generated and/or presented in the same narrative viewpoint as the other portions of the one or more summaries.

In step 321, the summarizer platform 103 determines the set proportion of information that is contained in the one or more communications that should be contained in the one or more summaries. By way of example, if the one or more communications contained approximately 100 words, and the set proportion for the summaries is approximately 50%, the one or more summaries would include approximately 50 words taking into account the capacity to reduce the one or more communications to approximately 50 words, as discussed above. By setting the proportion of the summary amount, the user can control the amount of potential information loss and/or the specificity of the summary. The set proportion of the one or more summaries compared to the one or more communications adds to filtering of the one or more communications for determining what information is contained in the one or more summaries. In one embodiment, all of the original words used in the one or more communications are used in determining the proportion amount. In one embodiment, only the subject, verbs and objections analyzed by the grammar module 203 are considered in determining the proportion amount.

In step 323, the summarizer platform 103 generates one or more summaries based on, for example, the relevancy information generated from the grammar analysis and the metadata analysis, and the additional terms based on the metadata information. The one or more summaries are also generated according to the set proportion. The summarizer platform 103 uses algorithms that take into account the relevancy information compared to the proportion amount to filter out the terms in the original one or more communications that are not included in the summary.

In step 325, the summarizer platform 103 transforms the one or more summaries into the set narrative viewpoint, as discussed above, to give the proper sense and desired semantics to the final one or more summaries. In one example, the relevant terms from the one or more communications that are included in a summary are, "Jim John wants Bob Doe to start prioritizing what the team needs to concentrate on. It's urgent." In one embodiment, if the summarizer platform 103 is set to present the summary in the second-person narrative viewpoint to sound as if a personal assistant is presenting the summary to the user, the resulting summary after narrative viewpoint transformation would be, including a prompt based on the language in the original one or more communications, "You received an email from Jim John, your manager, and he wants you to prioritize what the teams needs to concentrate on. Would you like to add this to your TODO list?" Presenting the summary in a set narrative viewpoint, according to the desired semantics, allows the user to get a better sense of the information contained in the summary.

In step 327, the summarizer platform 103 presents the one or more summaries according to the set method of presentation. In one embodiment, the summarizer platform 103 presents the one or more summaries for presentation on the display of the UE 101. In one embodiment, the summarizer platform 103 presents the one or more summaries to a text-to-speech synthesizer and the one or more summaries are converted into audio messages that are then "read" to the user as if a personal assistant is reading a summary of the one or more communications to the user. The text-to-speech synthesizers can be any conventional text-to-speech synthesizer. In one embodiment, the summarizer platform 103 presents the one or more summaries on the display of the UE 101 and as audio messages read to the user.

Figure 4:
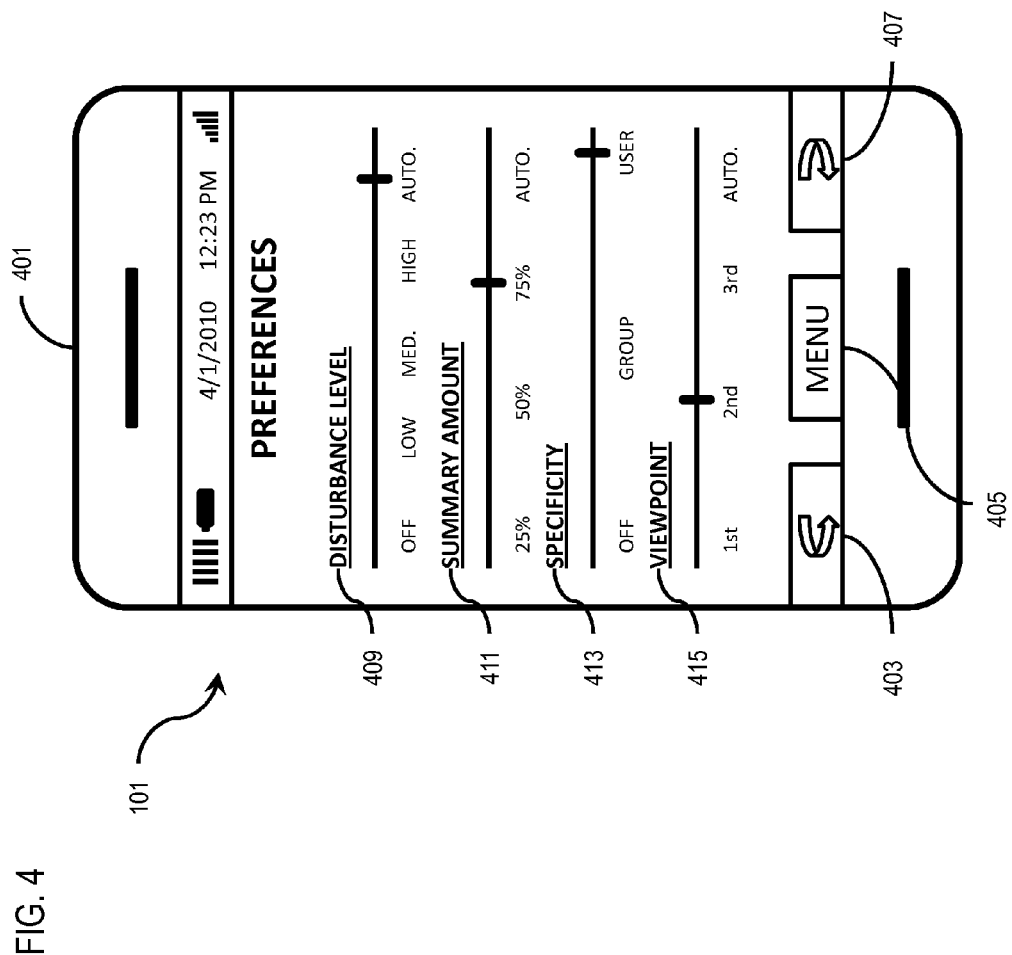
FIG. 4 is a diagram of a user interface utilized in the process of FIG. 3, according to one embodiment.

FIG. 4 is a diagram of a user interface of a UE 101 utilized in the process 300 of FIG. 3, according to one embodiment. Indicator 401 illustrates the user interface of the UE 101 when configuring the summarizer platform 103 for summarizing one or more communications. As seen in FIG. 4, indicators 403, 405 and 407 allow for navigation through the user interface of the UE 101. Indicator 409 allows the user to configure whether the summarizer platform 103 summarizes one or more communications by turning on or off the summarizer platform 103. In one embodiment, indicator 409 also allows to control the summarizer platform 103 based on the context information, such that "LOW" requires low levels of disturbance such that all communications are summarized, "MED." allows medium levels of disturbance such that medium to long communications are summarized and short communications are presented to the user without summarization, and "HIGH" allows high levels of disturbance such that only long communications are summarized and short to medium communications are passed to the user without summarization. Additionally, indicator 409 indicates that the disturbance level can be set to automatic and then determined based on the context information of the UE 101, the user of the UE 101 or a combination thereof.

Indicator 411 allows the user to set the proportion of the language used in the one or more summaries to between, for example, approximately 25% to 75% of the original language of the one or more communications. Indicator 411 also allows the user to set the summarizer platform 103 to automatically determine the approximate proportion of the one or more summaries in comparison to the original one or more communications according to the "AUTO." setting.

Indicator 413 allows the user to set the specificity of the one or more summaries of the one or more communications. In one embodiment, "OFF" turns off the specificity option, "GROUP" excludes any information contained in the original one or more communications that does not refer to the user either individually or in a group, and "USER" excludes any information contained in the original one or more communications that does not refer to the user individually. By using the indicator 413, the user can narrow down the summaries to only information that pertains indirectly (e.g., by way of a group) and/or directly to the user.

Indicator 415 allows the user to set the narrative viewpoint of the summary according to, for example, either the first-person, second-person or third-person narrative viewpoints, depending on the preference of the user. Indicator 415 also, for example, allows the user to let the summarizer platform 103 determine the narrative viewpoint automatically based on the information contained in the original one or more communications.

Figure 5:
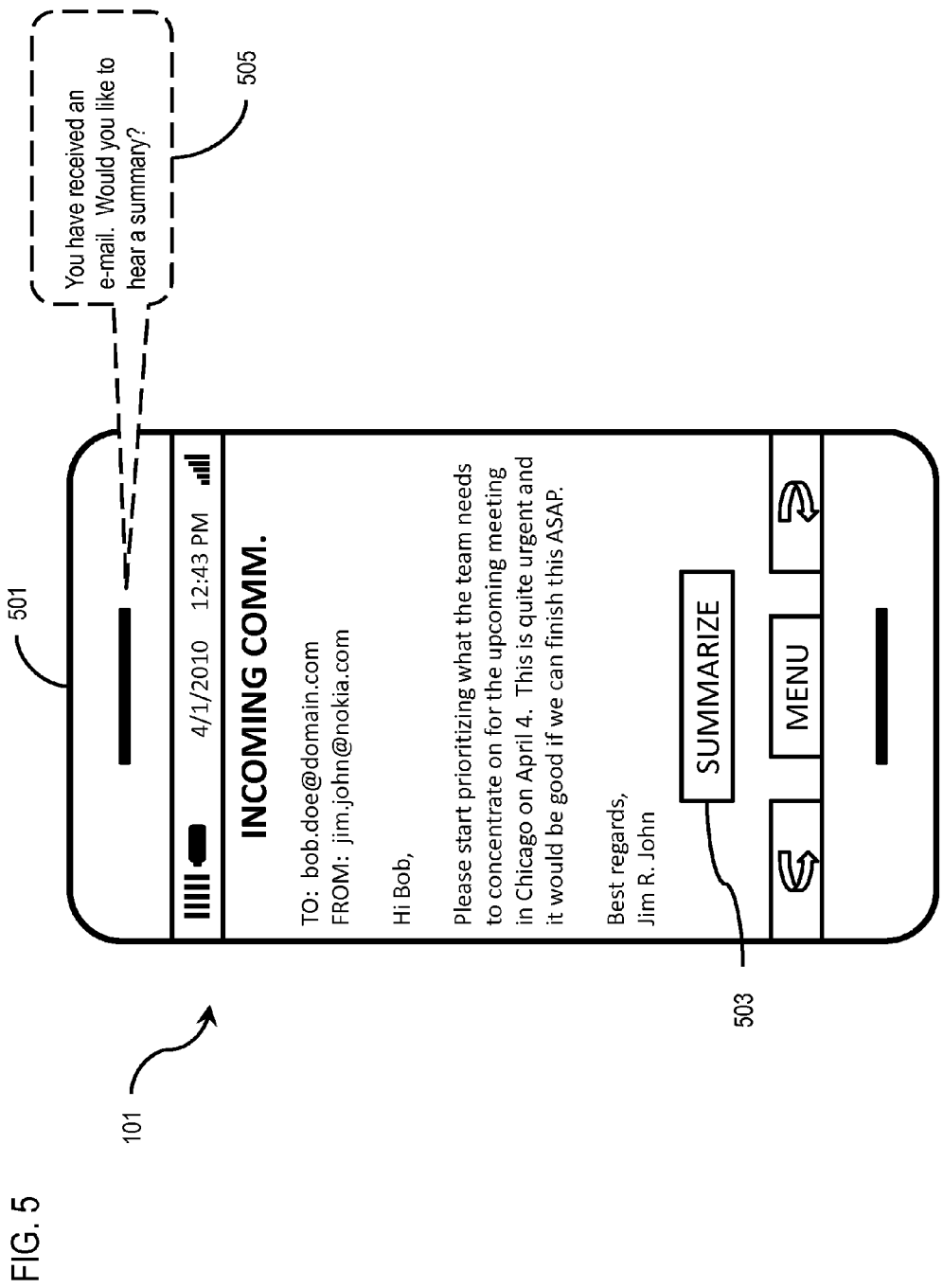
FIG. 5 is a diagram of a user interface utilized in the process of FIG. 3, according to one embodiment.

FIG. 5 is a diagram of a user interface of a UE 101 utilized in the process 300 of FIG. 3, according to one embodiment. Indicator 501 illustrates the user interface of the UE 101 for an incoming communication. By way of example, the incoming communication illustrated by indicator 501 is an e-mail directed to Bob Doe from Jim John. In one embodiment, the incoming communication is summarized after the user of the UE 101 selects indicator 503. In one embodiment, the incoming communication is summarized automatically by the summarizer platform 103 after the incoming message is displayed on, for example, the UE 101. In one embodiment, the incoming communication is summarized automatically by the summarizer platform 103 without displaying the incoming communication on the display of the UE 101. In one embodiment, as discussed above, the determination of whether to automatically generate the summary is based, at least in part, on the context information of the UE 101, the user of the UE 101 or a combination thereof. In one embodiment, the UE 101 is set to interact with the user through a voice-operated user interface. Accordingly, indicator 503 is absent from indicator 501. Rather, the UE 101 plays an audio message indicating that the incoming communication was received and prompts the user to listen to a summary of the incoming communication, as illustrated by indicator 505. In one embodiment, the UE 101 plays an audio message indicating that the incoming communication was received and automatically generates a summary of the incoming communication without prompting the user.

Figure 6A:
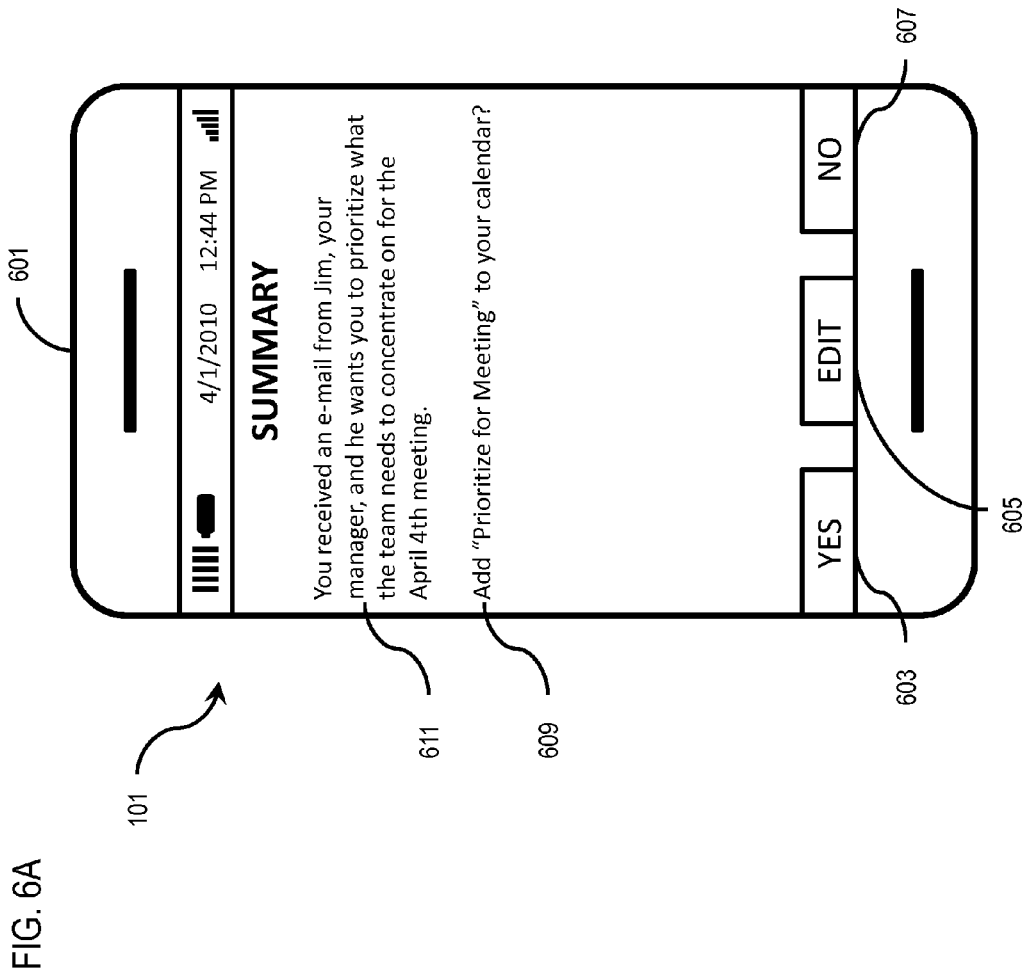
FIGS. 6A and 6B are diagrams of a user interfaces utilized in the process of FIG. 3, according to one embodiment.

FIG. 6A is a diagram of a user interface of a UE 101 utilized in the process 300 of FIG. 3, according one embodiment. Indicator 601 illustrates the user interface of the UE 101 displaying the summary of, for example, the communication illustrated in FIG. 5. In one embodiment, the summarizer platform 103 presents the summary of the communication by displaying the summary on the display of the UE 101 illustrated by indictor 611. As illustrated, the summary is presented to the user in the second-person narrative viewpoint as evidenced by references to the user being designed by, for example, the term "you." Metadata information is also included in the summary as evidenced by the reference to Jim being followed by "your manager." Accordingly, the user is able to quickly and efficiently understand the contents of the original message and act on the actions contained in the original message in an efficient manner with minimal to no distraction to a primary task, such as driving a car.

Further, indicator 609 illustrates a prompt generated in response to the communication. By way of example, the summarizer platform 103 determined a prompt of "Add 'Prioritize for Meeting' to your calendar" in response to receiving the communication. Using indicators 603, 605 and/or 607, the user of the UE 101 can accept the prompt, edit the prompt, or decline the prompt, respectively.

Figure 6B:
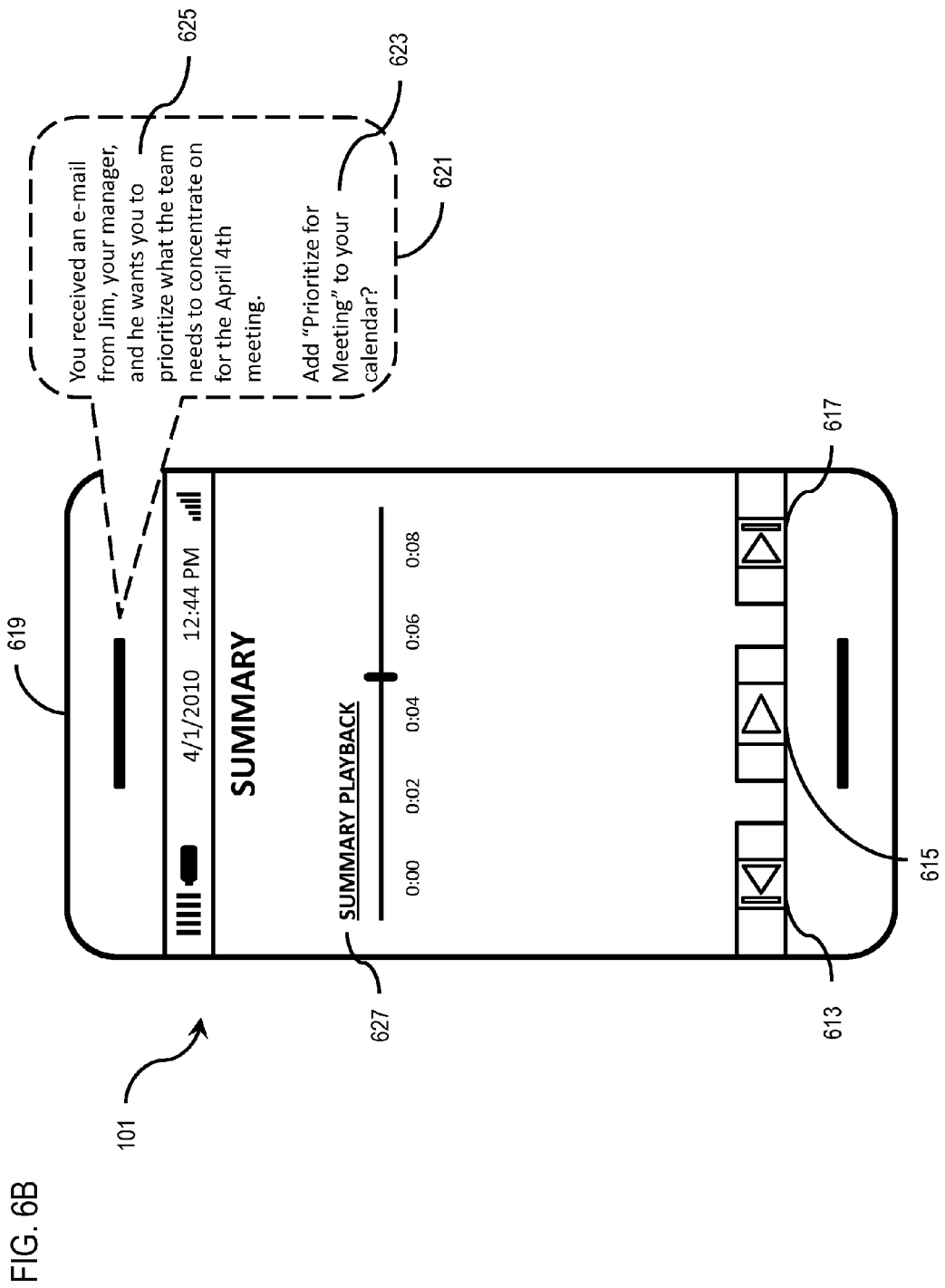

FIG. 6B is a diagram of a voice-operated user interface of a UE 101 utilized in the process 300 of FIG. 3, according one embodiment. Indicator 619 illustrates the voice-operated user interface of the UE 101 generating an audio message 621 in response to, for example, the communication illustrated in FIG. 5. The audio message 621 includes a summary 625 of the communication and a prompt 623 generated in response to the communication. As discussed above, the summary 625 is presented to the user in the second-person narrative viewpoint because reference to the user is designated by, for example, the term "you." Metadata information is also included in the summary because reference to Jim is followed by "your manager." Accordingly, the user is able to quickly and efficiently understand the contents of the original message and act on the actions contained in the original message with minimal to no distraction to a primary task, such as driving a car. Because the summary 625 is presented to the user as an audio message 621, the user can focus even more attention to a primary task, such as driving a car, without the need to look at the screen and read the summary. In response to the prompt played as an audio message, the user of the UE 101 can respond with a verbal command recognizable by an application 111 running one the UE 101 or by a service 107 running on one or more of the service providers 109 to respond to the prompt and perform the same functions of the indicators 603, 605 and/or 607 discussed above in reference to FIG. 6A. By presenting the summary and the prompt as a audio message, and allowing the user respond to the prompt with a verbal command, the summarizer platform 103 permits the user to focus on a primary task, such as driving, while still receiving and responding to his or her communications.

one embodiment, indicator 619 also includes a summary playback indicator 627 that illustrates, for example, the length of the audio message 621. Indictor 619 also includes indicators 613, 615 and 617 that allow the user rewind, replay or fast forward the audio message, respectively. In addition, verbal commands can be used instead of physically selecting the indicators 613, 615 and 617 as part of the voice-activated user interface.

Although FIGS. 6A and 6B illustrate separate user interfaces utilized in the process 300 of FIG. 3, the user interfaces can be combined in any desired combination such that a user operate the UE 101 graphically and verbally.

The processes described herein for summarizing communications may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 7:
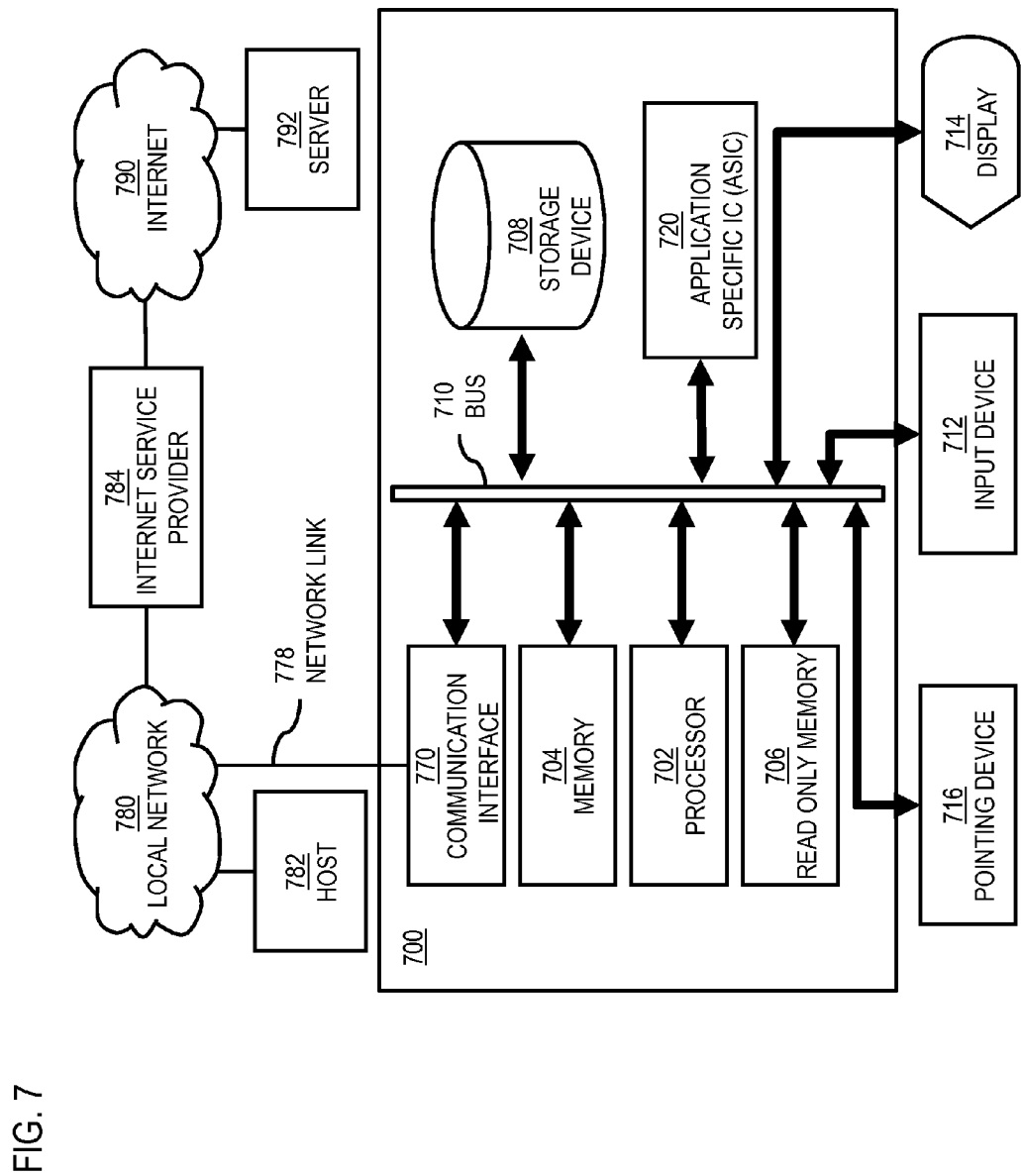
FIG. 7 is a diagram of hardware that can be used to implement an embodiment of the invention.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to summarize communications as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of summarizing communications.

A bus 710 includes one or more parallel conductors of information so that information is transferred quickly among devices coupled to the bus 710. One or more processors 702 for processing information are coupled with the bus 710.

A processor (or multiple processors) 702 performs a set of operations on information as specified by computer program code related to summarizing communications. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or any other dynamic storage device, stores information including processor instructions for summarizing communications. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or any other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for summarizing communications, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT), a liquid crystal display (LCD), a light emitting diode (LED) display, an organic LED (OLED) display, a plasma screen, or a printer for presenting text or images, and a pointing device 716, such as a mouse, a trackball, cursor direction keys, or a motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of ASICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for summarizing communications to the UE 101.

The term "computer-readable medium" as used herein refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or any other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

FIG. 8 illustrates a chip set or chip 800 upon which an embodiment of the invention may be implemented. Chip set 800 is programmed to summarize communications as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of summarizing communications.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to summarize communications. The memory 805 also stores the data associated with or generated by the execution of the inventive steps.

Figure 9:
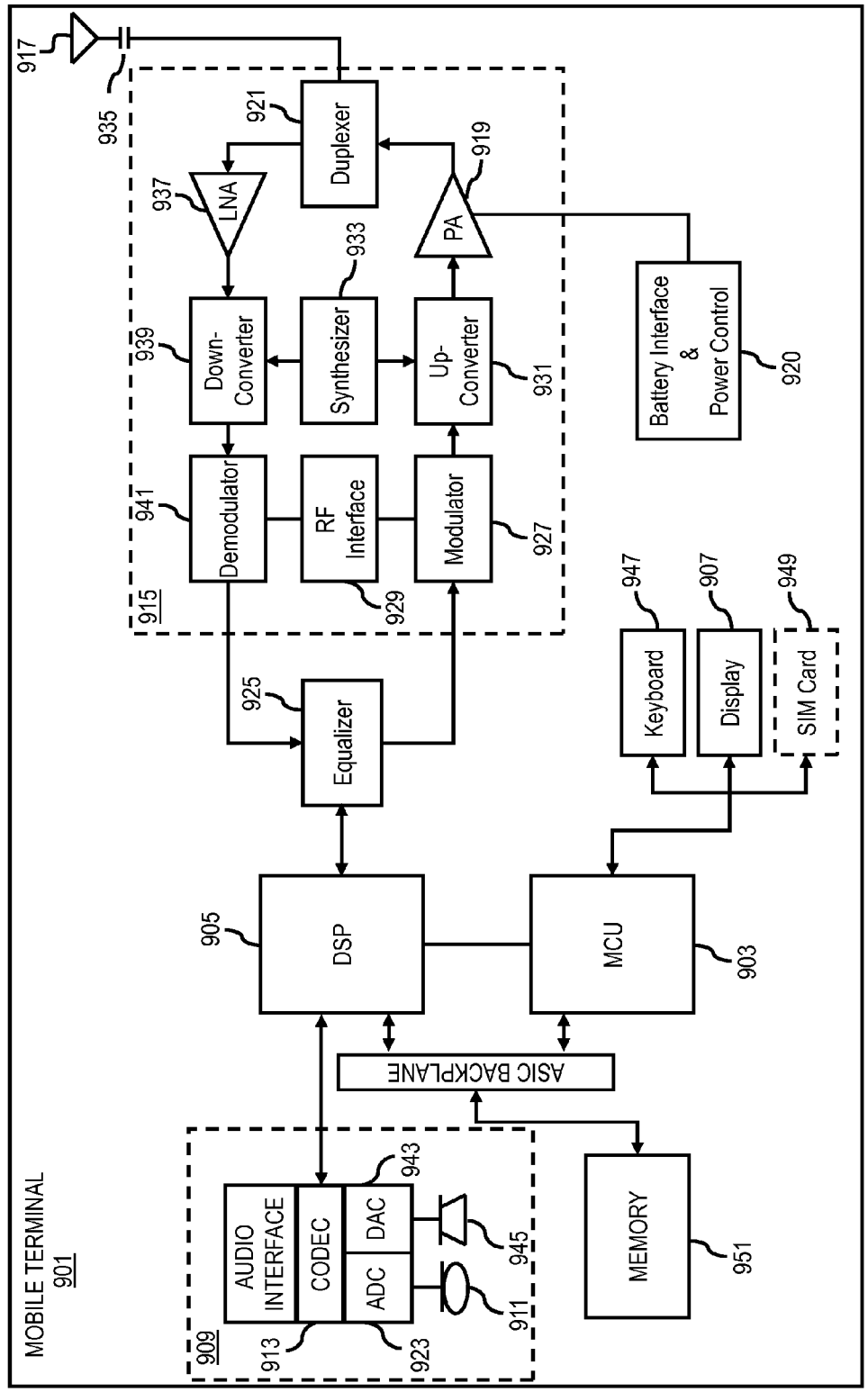
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 901, or a portion thereof, constitutes a means for performing one or more steps of summarizing communications. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of summarizing communications. The display 907 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903 which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 to summarize communications. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   a processing, by a processor, of one or more telecommunications to generate at least one summary;
   a parsing, by the processor, of the one or more telecommunications into one or more data elements;
   a determination of metadata associated with the one or more data elements, wherein the metadata is based, at least in part, on information from sources other than the one or more telecommunications, and wherein the at least one summary is based, at least in part, on the one or more data elements, the metadata, or a combination thereof;
   a selection of at least one narrative viewpoint;
   a transformation, by the processor, of the at least one summary based, at least in part, on the at least one narrative viewpoint; and
   a determination to cause, at least in part, a presentation of the transformation for reducing user information overload.

2. A method of claim 1, wherein the (1) data and/or (2) information and/or (3) at least one signal are further based, at least in part, on the following:
   a determination of relevancy information of the one or more data elements,
   wherein the generating of the at least one summary is based, at least in part, on the relevancy information.

3. A method of claim 2, wherein the (1) data and/or (2) information and/or (3) at least one signal are further based, at least in part, on the following:
   a processing of the one or more data elements using at least one grammar analyzer to determine at least a portion of the relevancy information.

4. A method of claim 3, wherein the (1) data and/or (2) information and/or (3) at least one signal are further based, at least in part, on the following:
   respective frequencies of the one or more data elements, relationship information among the one or more data elements, one or more definitions of the one or more data elements, or a combination thereof,
   wherein the relevancy information is based, at least in part, on the respective frequencies, the relationship information, the one or more definitions, or a combination thereof.

5. A method of claim 2, wherein the (1) data and/or (2) information and/or (3) at least one signal are further based, at least in part, on the following:
   a processing of the metadata to determine at least a portion of the relevancy information, one or more other data elements to include in the at least one summary, or a combination thereof.

6. A method of claim 2, wherein the (1) data and/or (2) information and/or (3) at least one signal are further based, at least in part, on the following:
   a processing of the metadata to generate the transformation.

7. A method of claim 1, wherein the (1) data and/or (2) information and/or (3) at least one signal are further based, at least in part, on the following:
   a processing of the one or more telecommunications, the at least one summary, or a combination thereof to determine one or more related actions; and
   an inclusion of the one or more related actions in the at least one summary.

8. A method of claim 7, wherein the (1) data and/or (2) information and/or (3) at least one signal are further based, at least in part, on the following:
   a determination of one or more applications, one or more services, or a combination thereof for performing the one or more related actions;
   a generation of at least one prompt in the at least one narrative viewpoint to initiate the one or more applications, the one or more services, or a combination thereof; and
   an inclusion of the at least one prompt in the at least one summary.

9. A method of claim 1, wherein the processing of the one or more telecommunications includes a determination of which of the one or more telecommunications should be summarized and the presentation of the transformation is via a voice-based user interface.

10. A method of claim 1, wherein the (1) data and/or (2) information and/or (3) at least one signal are further based, at least in part, on the following:
    context information associated with at least one recipient of the one or more telecommunications,
    wherein an initiation of the processing of the one or more telecommunications is based, at least in part, on the context information.

11. An apparatus comprising:
    at least one processor; and
    at least one memory including computer program code for one or more programs,
    the at least one memory and the computer program code configured to, with the at least one processor, cause the apparatus to perform at least the following,
    process and/or facilitate a processing of one or more telecommunications to generate at least one summary;
        cause, at least in part, a parsing of the one or more telecommunications into one or more data elements;
        determine metadata associated with the one or more data elements, wherein the metadata is based, at least in part, on information from sources other than the one or more telecommunications, and wherein the at least one summary is based, at least in part, on the one or more data elements, the metadata, or a combination thereof;
        select at least one narrative viewpoint;
        cause, at least in part, a transformation of the at least one summary based, at least in part, on the at least one narrative viewpoint; and
        determine to cause, at least in part, a presentation of the transformation for reducing user information overload.

12. An apparatus of claim 11, wherein the apparatus is further caused to:
    determine relevancy information of the one or more data elements,
    wherein the generating of the at least one summary is based, at least in part, on the relevancy information.

13. An apparatus of claim 12, wherein the apparatus is further caused to:
    process and/or facilitate a processing of the one or more data elements using at least one grammar analyzer to determine at least a portion of the relevancy information.

14. An apparatus of claim 13, wherein the apparatus is further caused to:
    determine respective frequencies of the one or more data elements, relationship information among the one or more data elements, one or more definitions of the one or more data elements, or a combination thereof, wherein the relevancy information is based, at least in part, on the respective frequencies, the relationship information, the one or more definitions, or a combination thereof.

15. An apparatus of claim 12, further comprising:
process and/or facilitate a processing of the metadata to determine at least a portion of the relevancy information, one or more other data elements to include in the at least one summary, or a combination thereof.

16. An apparatus of claim 12, wherein the apparatus is further caused to:
process and/or facilitate a processing of the metadata to generate the transformation.

17. An apparatus of claim 11, wherein the apparatus is further caused to:
process and/or facilitate a processing of the one or more telecommunications, the at least one summary, or a combination thereof to determine one or more related actions; and
cause, at least in part, an inclusion of the one or more related actions in the at least one summary.

18. An apparatus of claim 17, wherein the apparatus is further caused to:
determine one or more applications, one or more services, or a combination thereof for performing the one or more related actions;
cause, at least in part, a generation of at least one prompt to initiate the one or more applications, the one or more services, or a combination thereof; and
cause, at least in part, an inclusion of the at least one prompt in the at least one summary.

19. An apparatus of claim 11, wherein the presentation of the transformation is via a voice-based user interface.

20. An apparatus of claim 11, wherein the apparatus is further caused to:
determine context information associated with at least one recipient of the one or more telecommunications,
wherein an initiation of the processing of the one or more telecommunications is based, at least in part, on the context information.

21. A method of claim 1, wherein the (1) data and/or (2) information and/or (3) at least one signal are further based, at least in part, on the following:
a determination of a set proportion of information that is contained in the one or more telecommunications that should be contained in the at least one summary,
wherein all of the original words in the one or more telecommunications are used in the determination of the set proportion.

* * * * *